United States Patent [19]
Breuer

[11] Patent Number: 5,868,409
[45] Date of Patent: Feb. 9, 1999

[54] ALUMINUM AXLE JOURNAL OR WHEEL MOUNT WITH AN INSERTED STEEL PIVOT AND A METHOD FOR THE PRODUCTION THEREOF

[75] Inventor: Heinz-Werner Breuer, Ennepetal, Germany

[73] Assignee: Carl Dan. Peddinghaus GmbH & Co. KG, Ennepetal, Germany

[21] Appl. No.: 802,544

[22] Filed: Feb. 18, 1997

[30] Foreign Application Priority Data

Feb. 19, 1996 [DE] Germany .................. 196 06 079.6

[51] Int. Cl.$^6$ ....................................... B62D 7/16
[52] U.S. Cl. ........................ 280/93.512; 280/124.125
[58] Field of Search ................ 280/124.11, 124.113, 280/124.125, 89.1, 124.127, 93.512

[56] References Cited

U.S. PATENT DOCUMENTS 3,801,124  4/1974  Afanador et al. .
5,263,731  11/1993  Deutshcel ................. 280/93.512

FOREIGN PATENT DOCUMENTS 7201832  5/1972  Germany .
2349731  4/1974  Germany .

Primary Examiner—Eric D. Culbreth
Attorney, Agent, or Firm—Dilworth & Barrese

[57] ABSTRACT

An aluminum axle journal or wheel mount comprises an aluminum body to which a bearing unit is secured. A steel pivot is inserted into the aluminum body which supports the wheel bearing unit and which is braced against the aluminum body. The aluminum body can be either cast or forged and after it has been produced is designed with a dimensionally accurate opening that serves to receive the steel pivot. After pressing in the steel pivot, a wheel bearing unit is fitted onto the steel pivot and secured against axial shifting using a suitable attachment, preferably a necked-down bolt.

13 Claims, 2 Drawing Sheets

ALUMINUM AXLE JOURNAL OR WHEEL MOUNT WITH AN INSERTED STEEL PIVOT AND A METHOD FOR THE PRODUCTION THEREOF

BACKGROUND OF THE INVENTION

The invention relates to an axle journal (steering knuckle) or wheel mount comprising an aluminum body, a wheel bearing unit, and a steel pivot, and a method of producing an axle journal or wheel mount.

On their front axles, rear-wheel drive vehicles have axle journals that each support the steerable wheel and are pivotable around a steering knuckle pin.

In the prior art, rear-wheel drive vehicles usually have on their front axle steel-forged axle journals with pivots. The pivots each serve to receive a wheel bearing, the wheel hub, brake disk and finally the actual wheel.

On their rear axle, front-wheel drive vehicles comprise a wheel mount in which either a steel pivot is integrated to receive the wheel bearing or on which the wheel bearing as a unit is directly screwed.

The advantage of steel-forged axle journals or wheel mounts with pivots lies in the very high mechanical strength properties, such as very high yield points. The disadvantage of steel-forged axle journals or wheel mounts with pivots does, however, lie in the fact that these components are relatively heavy and hence stand in the way of efforts to reduce the weight of automobiles in particular.

To reduce the weight of the axle journals or wheel mounts, aluminum axle journals produced by chill casting were developed. A wheel bearing is screwed on the aluminum casting. In terms of the outer shape, the aluminum axle journals or wheel mounts clearly differ from the steel-forged axle journals. The aluminum axle journals or wheel mounts do not have any integrated aluminum pivots because an aluminum pivot is unable to transfer the forces and moments transferred from the wheel via the wheel bearings. A comparison of the moduli of elasticity of steel and aluminum reveals the high elasticity of aluminum. Nevertheless, to achieve a desirable strength, the wheel bearing on the aluminum casting has to be attached to a point at which the aluminum casting is sufficiently dimensioned to transfer reliably the emergent forces and moments. This does, however, result in a wheel bearing unit that has a large internal diameter, on account of which this wheel bearing unit entails considerable expense. Furthermore, the weight saving obtained by using an aluminum casting is again largely offset by the heavy wheel bearing unit.

SUMMARY OF THE INVENTION

The invention is based on the object of developing a low-weight axle journal or wheel bearing that can be inexpensively manufactured and which can reliably absorb and transfer the forces and torques that arise.

The invention's object is solved by an axle journal or wheel mount comprising the features of the steel pivot being inserted into the aluminum body, braced against the aluminum body and supporting the wheel bearing unit. The method of producing the axle journal or wheel mount is characterized by the procedural steps of casting or forging an aluminum body, forming a dimensionally accurate opening to receive a steel pivot in a cast or forged aluminum body, pressing the steel pivot into the opening of the aluminum body, fitting a wheel bearing unit onto the steel pivot, axially securing the wheel bearing unit on the steel pivot, and bracing the steel pivot with the aluminum body.

By inserting a steel pivot into the aluminum body and by having it support the wheel bearing unit, the forces that are transferred via the wheel bearing to the axle journal or wheel mount are absorbed by a component whose mechanical strength properties are far superior to those of a comparable aluminum component.

By having the steel pivot braced against the aluminum body, no difficulties arise in terms of materials when pairing off the aluminum body and the steel pivot.

The steel pivot is preferably pressed into the aluminum body. Pressing the steel pivot into the aluminum body produces a very efficient, i.e. stable, connection between the two components and this connection is further enhanced by the aforementioned bracing of the steel pivot with the aluminum body.

The steel pivot is preferably provided with an internal thread which runs in the steel pivot's longitudinal direction and with which an attachment element engages. Designing the steel pivot in this way makes it possible on the one hand to screw a suitable attachment element to the steel pivot and on the other hand to prevent the steel pivot's outer annular cross section, which is important with respect to the strength of the steel pivot, from being weakened by sudden cross-sectional changes or notches.

The attachment element is preferably a necked-down bolt. The use of a necked-down bolt has the advantage that the steel pivot can be reliably braced with the aluminum body. On account of the considerable elongation path that is characteristic for necked-down bolts for a predetermined screw force, these bolts are particularly suitable for ensuring that in the present instance and particularly under varying loads, the steel pivot is durably and reliably braced with the aluminum body.

The wheel bearing unit preferably consists of a double-row angular contact ball bearing. Because they require a small axial space, provide a large support basis and hence moment carrying capacity, and since they have a low weight, double-row angular contact ball bearings are particularly suitable for the invention's aluminum axle journal or wheel mount.

BRIEF DESCRIPTION OF THE DRAWINGS

The invention will be described in the following purely by way of example based on the attached drawings in which.

DESCRIPTION OF THE PREFERRED EMBODIMENTS

Figure 1:
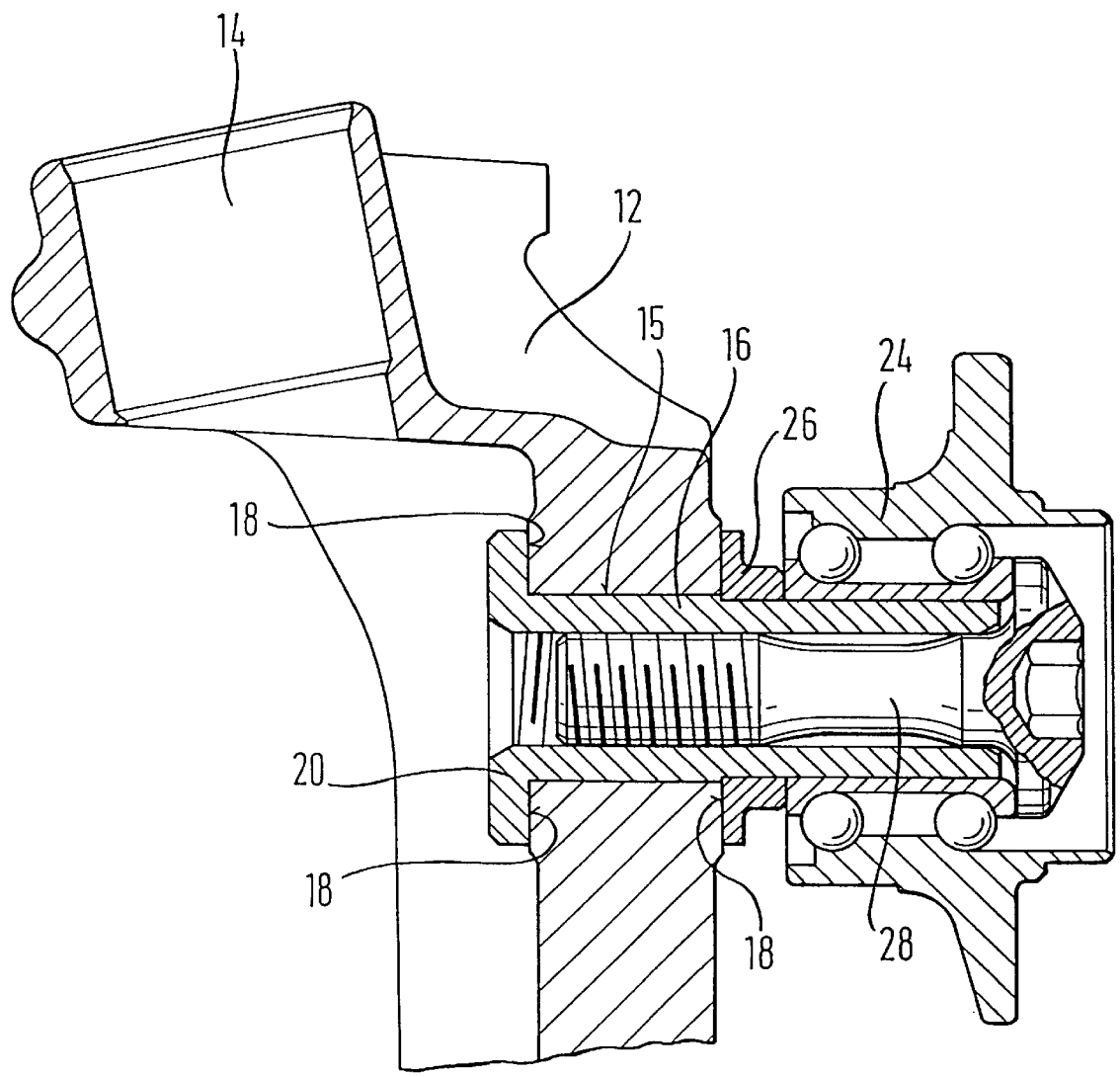
FIG. 1 shows a section through the axle journal or wheel mount according to the present invention.

FIG. 1 shows an aluminum axle journal or wheel mount that has an inserted steel pivot in accordance with the present invention.

An aluminum body, whose blank is formed by a casting or forging process, is designated by reference symbol 12. The body 12 may, in addition to aluminum, be formed from other materials which entail a clear weight saving compared to the steel-forged components in the prior art and which have comparable mechanical properties. But as aluminum represents the preferred material option, the term aluminum body will always be used in the following. After the blank has been cast or forged, it is machined at all the points of contact with other components. In this way, for example, the bore 14 for receiving the spring damper strut is dimensioned to the desired extent as part of a subsequent machining step. The bore 15 which receives the steel pivot 16 is similarly formed in the aluminum body 12. The surfaces 18 of the aluminum body 12 are also obtained by a machining production step.

The steel pivot 16 is preferably steel-forged, thus producing a very high mechanical strength. Of course, the steel pin can, however, also be produced in another manner that is known in engineering. The steel pivot 16 is integrally connected to a head 20, whose side that makes contact (when installed) with aluminum body 12 has a planar shape or is shaped to correspond to the machined surface 18—facing the head 20 of the steel pivot—of the aluminum body 12.

The outer surface of the steel pivot 12 is also machined in order on the one hand to receive a wheel bearing unit and on the other to lend a defined strength to the connection between the aluminum body 12 and steel pivot 16 when interacting with the bore 15 of the aluminum body 12.

The steel pivot 16 supports a wheel bearing unit 24 which in the present embodiment is formed as a double-row angular contact ball bearing. Double-row angular contact ball bearings are preferably used when the ratio between the construction length and radial construction height is low. Since double-row angular contact ball bearings require a small axial space, and because the total mounting has a low weight, a large support basis and hence moment carrying capacity, angular contact ball bearing wheel mounting units are frequently used for non-driven wheels. The wheel hub, brake disk and lastly the actual wheel are secured to the wheel bearing unit 24.

The wheel bearing unit 24 mounted onto the steel pivot 16 is axially secured by bracing it against the aluminum body 12. For this purpose, a spacer ring 26 which is used both for axial alignment of the wheel bearing unit and contributes toward the axial attachment thereof is fitted onto the steel pivot 16 between the inner race of the wheel bearing unit 24 and the aluminum body 12. The spacer ring 26 is a rotationally symmetrical body preferably manufactured from steel. A sealing lip runs on the smaller external diameter of the spacer ring 26 to protect the wheel bearing.

The wheel bearing unit is axially secured by a suitable attachment element that is connected to the steel pivot 16. The attachment element is preferably a necked-down bolt 28 that can be screwed into an internal thread in the steel pivot 16. For this purpose, the steel pivot 16 is provided along its center axis with a bore and an internal thread. The necked-down bolt 28 has a head which, when installed, makes contact with the inner race of the wheel bearing unit 24 and braces this unit against the spacer ring 26, the aluminum body 12 and in turn the head 20 of the steel pivot 16. The wheel bearing unit 24 is therefore securely connected to the aluminum body 12 and is axially aligned by means of a suitable spacer ring 26. The necked-down bolt 28 is preferably designed as a hexagonal socket reduced-shaft bolt. Of course other attachment means are also possible.

Figure 2:
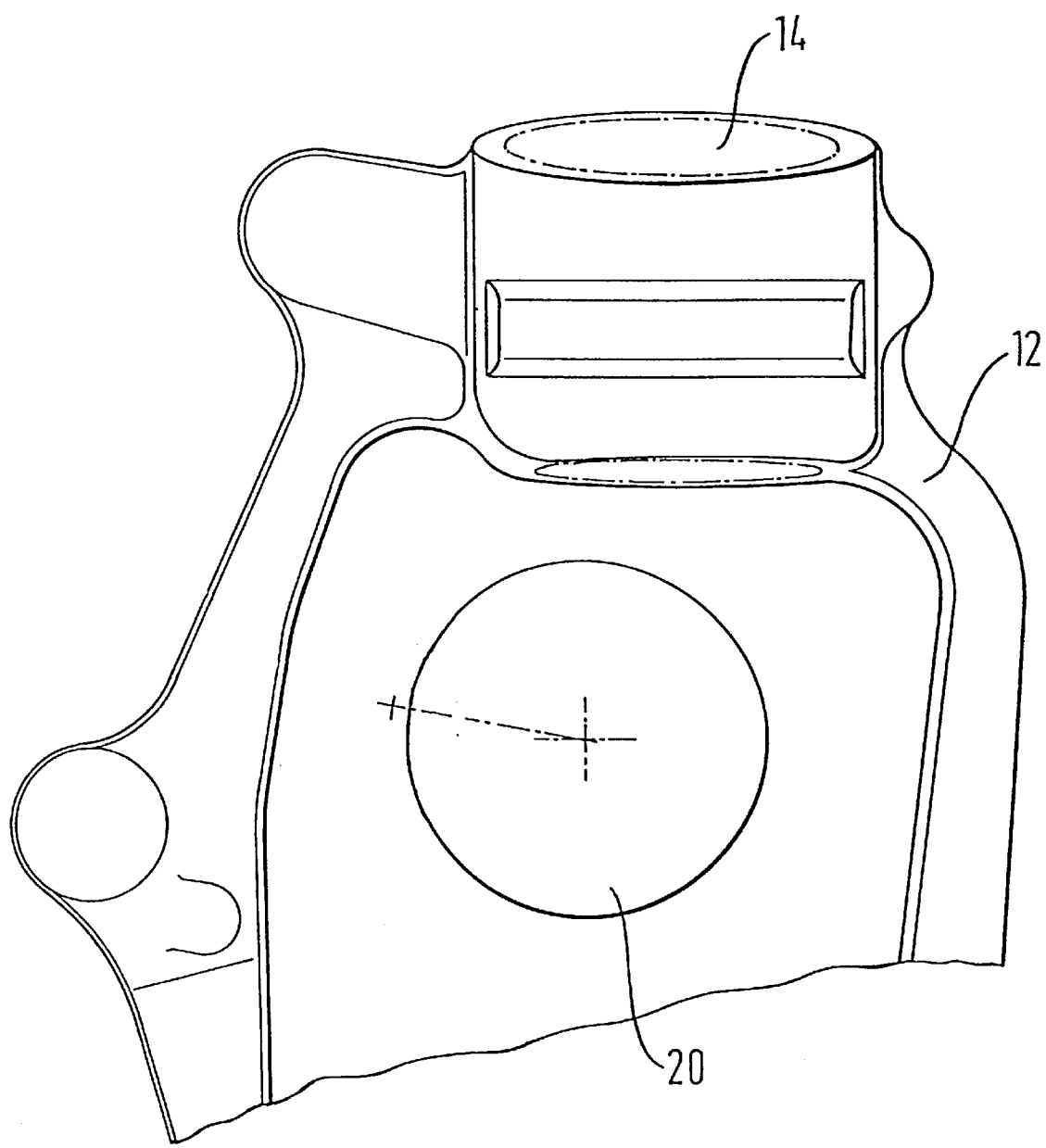
FIG. 2 shows a side view of the axle journal or wheel mount as viewed from the center of the vehicle.

FIG. 2 shows a side view of the steering knuckle pin depicted in FIG. 1.

The aluminum body 12 can be produced in various ways. First of all, the blank, from which the aluminum body 12 is produced after it has been subsequently machined, can be forged. The wrought alloys employed, as well as the heat treatment thereof during machining, result in high mechanical strength properties.

Classic chill casting is another alternative that can be performed very cost-effectively, particularly when high quantities are needed. Since the mechanical properties of the aluminum casting are worse than in the forging technique, they have to be compensated by corresponding dimensioning, i.e. greater wall thicknesses. Nevertheless, the major benefit in terms of the weight saving obtained by using an aluminum body is to an extent lost again as a result.

The aluminum body can equally be manufactured using a pressure casting process such as the squeeze casting technique, or a vacuum casting process such as the vacural technique. These techniques represent a compromise between forging and chill casting, and result in an aluminum body with mechanical strength properties lying between those of the forged part and of the casting produced by chill casting. Another method of producing the aluminum body is the thixoforming technique in which aluminum is processed in a doughy phase. The aluminum blank's mechanical properties are only marginally less than those of the aluminum forged part, but the production costs are much lower.

The aluminum axle journal or wheel mount according to the present invention is characterized by a very low weight, yet enjoys excellent mechanical strength properties. By receiving a steel pivot in the aluminum body and by bracing the bearing unit supported on the steel pivot against the aluminum body, an axle journal or wheel mount is obtained which is simple to manufacture, simple and convenient to mount and which has benefits in terms of weight compared to the axle journals and wheel mounts known in the prior art.

I claim:

1. An axle journal or wheel mount comprising:
   an aluminum body,
   a wheel bearing unit, and
   a steel pivot,
   wherein
      said steel pivot is inserted into said aluminum body and braced against said aluminum body, and
      said steel pivot supports said wheel bearing unit.

2. An axle journal or wheel mount according to claim 1, characterized in that said steel pivot is pressed into said aluminum body.

3. An axle journal or wheel mount according to claim 1, characterized in that said steel pivot has a bore running in the longitudinal direction of said steel pivot and provided with an internal thread with which an attachment element engages.

4. An axle journal or wheel mount according to claim 3, characterized in that said attachment element is a necked-down bolt.

5. An axle journal or wheel mount according to claim 1, characterized in that said wheel bearing unit is a double-row angular contact ball bearing.

6. An axle journal or wheel mount according to claim 1, characterized in that said steel pivot is pressed into said aluminum body and said wheel bearing unit is a double-row angular contact ball bearing.

7. An axle journal or wheel mount according to claim 6, characterized in that said steel pivot has a bore running in the longitudinal direction of said steel pivot and provided with an internal thread with which an attachment element engages.

8. An axle journal or wheel mount according to claim 7, characterized in that said attachment element is a necked-down bolt.

9. An axle journal or wheel mount according to claim 1, characterized in that said steel pivot has a bore running in the longitudinal direction of said steel pivot and provided with an internal thread with which an attachment element engages, and said wheel bearing unit is a double-row angular contact ball bearing.

10. An axle journal or wheel mount according to claim 9, characterized in that said attachment element is a necked-down bolt.

11. An axle journal or wheel mount comprising:

an aluminum body, a wheel bearing unit, and a steel pivot, wherein said steel pivot is pressed into said aluminum body and braced against said aluminum body, and said steel pivot supports said wheel bearing unit, and said steel pivot has a bore running in the longitudinal direction of said steel pivot and provided with an internal thread with which an attachment element engages.

12. An axle journal or wheel mount according to claim 11, characterized in that said attachment element is a necked-down bolt.

13. A method of producing an axle journal or wheel mount including an inserted steel pivot comprising the steps of:

casting or forging an aluminum body;

forming a dimensionally accurate opening to receive a steel pivot in said cast or forged aluminum body;

pressing said steel pivot into the opening of said aluminum body;

fitting a wheel bearing unit onto said steel pivot;

axially securing said wheel bearing unit on said steel pivot; and bracing said steel pivot with said aluminum body.

\* \* \* \* \*